(12) United States Patent
Mohaupt et al.

(10) Patent No.: US 10,080,202 B2
(45) Date of Patent: Sep. 18, 2018

(54) DEVICE, METHOD, AND COMPUTER PROGRAM FOR A TRANSCEIVER SYSTEM

(71) Applicant: VOLKSWAGEN AG, Wolfsburg (DE)

(72) Inventors: Matthias Mohaupt, Bochum (DE); Jens Kampermann, Haan (DE)

(73) Assignee: Volkswagen AG (DE)

(*) Notice: Subject to any disclaimer, the term of this patent is extended or adjusted under 35 U.S.C. 154(b) by 0 days.

(21) Appl. No.: 15/299,912

(22) Filed: Oct. 21, 2016

(65) Prior Publication Data

US 2017/0118724 A1    Apr. 27, 2017

(30) Foreign Application Priority Data

Oct. 26, 2015 (EP) ..................... 15191411

(51) Int. Cl.
| | |
|---|---|
| H04W 4/00 | (2018.01) |
| H04W 52/24 | (2009.01) |
| H04W 4/80 | (2018.01) |
| H04L 12/26 | (2006.01) |
| H04W 72/04 | (2009.01) |
| H04W 52/38 | (2009.01) |

(52) U.S. Cl.
CPC .......... *H04W 52/247* (2013.01); *H04L 43/16* (2013.01); *H04W 4/008* (2013.01); *H04W 4/80* (2018.02); *H04W 52/243* (2013.01); *H04W 72/0453* (2013.01); *H04W 52/38* (2013.01)

(58) Field of Classification Search
None
See application file for complete search history.

(56) References Cited

U.S. PATENT DOCUMENTS

| | | | |
|---|---|---|---|
| 8,611,888 B2 | 12/2013 | Immonen et al. | |
| 2013/0225095 A1 | 8/2013 | Hong et al. | |
| 2014/0269857 A1 | 9/2014 | Rimini et al. | |
| 2014/0274105 A1* | 9/2014 | Wang .................. | H04W 52/244 455/454 |
| 2014/0274179 A1* | 9/2014 | Zhu ...................... | H04W 52/243 455/509 |
| 2017/0094575 A1* | 3/2017 | Bercovici ............. | H04W 36/20 |
| 2017/0181174 A1* | 6/2017 | Lindoff ............... | H04W 72/082 |

FOREIGN PATENT DOCUMENTS

DE    112014000473 T5    10/2015

OTHER PUBLICATIONS

Search Report for European Patent Application No. 15191411.6; dated Jan. 15, 2016.
Office Action for European Patent Application No. 15191411.6; dated Jun. 21, 2018.

\* cited by examiner

*Primary Examiner* — Otis L Thompson, Jr.
(74) *Attorney, Agent, or Firm* — Barnes & Thornburg LLP (57) ABSTRACT

An apparatus, a method, and a computer program for a transceiver system having a first communications module for communication in a first mobile radio system and a second communications module for communication in a second radio system. The apparatus has a control module to adapt a transmission power used in the first mobile radio system on the basis of an activity of the second communications module in the second mobile radio system.

16 Claims, 8 Drawing Sheets

DEVICE, METHOD, AND COMPUTER PROGRAM FOR A TRANSCEIVER SYSTEM

PRIORITY CLAIM

This patent application claims priority to European Patent Application No. 15191411.6, filed 26 Oct. 2015, the disclosure of which is incorporated herein by reference in its entirety.

SUMMARY

Exemplary embodiments relate to an apparatus, a method and a computer program for a transceiver system comprising a first communications module for communication in a first mobile radio system and comprising a second communications module for communication in a second mobile radio system, embodied to adapt a transmission power used in the first mobile radio system on the basis of an activity of the second communications module in the second mobile radio system.

BRIEF DESCRIPTION OF THE DRAWINGS

Disclosed embodiments are described in more detail below with reference to the drawings, although, in general, there is no overall restriction to the exemplary embodiments. In detail.

DETAILED DESCRIPTION

Networking of vehicles increasingly assumes a central position in vehicle construction. Both external networking of the vehicles, e.g., in a vehicle-to-vehicle communication network or as networking with a workshop or for parking assistance, and internal networking, e.g., to offer vehicle passengers access to entertainment functions of the vehicle or provide an Internet access, are much-requested functions in new vehicles.

Here, vehicles may communicate simultaneously over a plurality of mobile radio systems. By way of example, the vehicles may set up an access point for the vehicle passengers, e.g., for an entertainment system by way of a wireless local area network (WLAN) or communicate with a parking garage or other vehicles by WLAN, and at the same time establish a connection to a cellular mobile radio system, for example, to a Universal Mobile Telecommunications System (UMTS) or to a Long Term Evolution (LTE) mobile radio system.

Intermodulation products are frequencies which arise if signals with two or more different frequencies are processed with a non-linear transfer function. Here, there are intermodulation products of different orders. If f1 is the first source frequency and f2 is the second source frequency, then the difference f1−f2 and the sum f1+f2 result in the second order intermodulation products, and 2f1−f2, f1−2f2 and 2f1+f2 result in the third order intermodulation products, etc.

Therefore, there is a need to provide an improved concept for treating intermodulation products when using different mobile radio systems, for example, in vehicles.

This need is met by the apparatus, the method and the computer program in accordance with the independent claims.

Exemplary embodiments develop an apparatus, a method and a computer program for a transceiver system comprising a first communications module for communication in a first mobile radio system and comprising a second communications module for communication in a second mobile radio system. The apparatus is embodied to adapt a transmission power used in the first mobile radio system on the basis of an activity of the second communications module. By way of example, if the first communications module and the second communications module use frequency bands in which there may be interference in the reception as a result of intermodulation, the apparatus can reduce the transmission power of the first communications module to reduce the interference.

Exemplary embodiments develop an apparatus for a transceiver system comprising a first communications module for communication in a first mobile radio system and comprising a second communications module for communication in a second mobile radio system. The apparatus comprises a control module embodied to adapt a transmission power used in the first mobile radio system on the basis of an activity of the second communications module in the second mobile radio system. Adapting the transmission power facilitates a reduction in interferences which may arise, for example, as a result of intermodulation of two transmission frequencies. The adaptation on the basis of the activity of the second communications module may facilitate a dynamic adaptation, for example, on the basis of currently used frequency bands and transmission activities.

In some exemplary embodiments, the activity of the second communications module may correspond to the use of a defined frequency band. Basing the adaptation on the use of the defined frequency band may facilitate undertaking the adaptation if intermodulation effects are to be expected by the use of specific transmission frequencies.

In some exemplary embodiments, the defined frequency band may be relative to a frequency band used by the first communications module. The relation between the frequency bands may be used to analyze the risk of interference between the communications modules.

In at least some exemplary embodiments, the control module may be embodied to reduce the transmission power used in the first mobile radio system on the basis of the activity of the second communications module. Reducing the transmission power may reduce interferences.

In at least some exemplary embodiments, the first communications module may be embodied to transmit in a first transmission frequency band. The second communications module may be embodied to transmit in a second transmission frequency band. The first communications module or the second communications module may be embodied to receive in at least one reception frequency band. An intermodulation product of a first transmission signal in the first transmission frequency band and of a second transmission signal in the second transmission frequency band may lie at least in part in the at least one reception frequency band. An adaptation of the transmission power may decrease a characteristic of the intermodulation product and reduce interference.

In some exemplary embodiments, the first communications module may be embodied to transmit in the first transmission frequency band and, at the same time, receive in the at least one reception frequency band. The second communications module may be embodied to transmit in the second transmission frequency band and, at the same time, receive in the at least one reception frequency band. In the case of simultaneous transmission and reception, an adaptation of the transmission power may reduce interference at the receiver, for example, as a result of intermodulation products.

In some exemplary embodiments, the device may furthermore comprise an input interface. The control module may be embodied to obtain information about an intermodulation signal, which is based on the intermodulation product, by way of the input interface. The control module may furthermore be embodied to determine information about an intermodulation power on the basis of the information about the intermodulation signal. The control module may furthermore be embodied to adapt the transmission power, which is used in the first mobile radio system, on the basis of the information about the intermodulation power. Adaptation of the transmission power on the basis of the intermodulation power facilitates a dynamic adaptation of the transmission power on the basis of the resultant interference and may reduce dependence on interference predictions.

In some exemplary embodiments, the control module may be embodied to adapt the transmission power which is used in the first mobile radio system in such a way that the intermodulation power lies below a threshold. Adaptation of the transmission power on the basis of the intermodulation power facilitates a dynamic adaptation of the transmission power on the basis of the resultant interference and may facilitate an appropriate level of the transmission power of the first communications module.

In at least some exemplary embodiments, the device may comprise an input interface. The control module may be embodied to obtain information about transmission signals of the first communications module and the second communications module by way of the input interface. The control module may be embodied to determine an expected intermodulation signal on the basis of the information about the transmission signals of the first communications module and the second communications module. The control module may be furthermore embodied to determine an interference-reduction signal on the basis of the expected intermodulation signal. By way of example, the interference-reduction signal may be used to compensate an interference of the reception signal.

In some exemplary embodiments, the device may furthermore comprise an output interface. The control module may be embodied to provide the interference-reduction signal to the first communications module and/or the second communications module by way of the output interface. Alternatively, or additionally, the control module may be embodied to provide signal processing of an input signal of the first communications module and/or the second communications module on the basis of the interference-reduction signal. The interference-reduction signal may be used to compensate an interference of the reception signal, for example, in the first communications module and/or second communications module or by preprocessing of the reception signal by the control module.

In some exemplary embodiments, the first communications module may be embodied to communicate in a short-range mobile radio system. The second communications module may be embodied to communicate in a cellular mobile radio system. The first communications module may independently set the transmission power in some exemplary embodiments and the second communications module may be dependent in the cellular mobile radio system on the setting of the transmission power by a base station.

In at least some exemplary embodiments, the first communications module may be embodied to communicate in a short-range mobile radio system pursuant to IEEE 802.11. The second communications module may be embodied to communicate in a Long Term Evolution mobile radio system, LTE, a Universal Mobile Telecommunications System, UMTS, or a 5th generation mobile radio system, 5G. The first communications module may independently set the transmission power in some exemplary embodiments and the second communications module may be dependent in the cellular mobile radio system on the setting of the transmission power by a base station.

In at least some exemplary embodiments, the first mobile radio system may be an infrastructure-based communications system. The first communications module may be embodied to communicate in the first mobile radio system as a client. The first communications module may independently set the transmission power in some exemplary embodiments.

Exemplary embodiments, furthermore, develop a method for a transceiver system for communication in two mobile radio systems. The method comprises communicating in a first mobile radio system. The method furthermore comprises communicating in a second mobile radio system. The method furthermore comprises adapting a transmission power used in the first mobile radio system on the basis of an activity in the second mobile radio system.

Exemplary embodiments, furthermore, develop a program comprising a program code for carrying out the method if the program code is run on a computer, a processor, a control module or a programmable hardware component.

Various exemplary embodiments are now described in more detail with reference to the attached drawings, in which some exemplary embodiments are depicted. In the figures, the thickness dimensions of lines, layers and/or regions may be depicted in an exaggerated state for reasons of clarity.

In the following description of the attached figures, which merely shows some exemplary embodiments, the same reference signs may denote the same or comparable components. Moreover, collective reference signs may be used for components and objects which occur a number of times in at least one exemplary embodiment or in a drawing but which are described together in view of one or more features. Components or objects, which are described by the same or collective reference sign, may, however, also have different configurations, where appropriate, in respect of individual, some or all features, for example, the dimensions thereof, to the extent that nothing else emerges explicitly or implicitly from the description.

Even though exemplary embodiments may be modified and varied in various ways, exemplary embodiments are depicted as examples in the figures and described in detail herein. However, it should be emphasized that it is not intended to restrict exemplary embodiments to the respectively disclosed forms but that, rather, exemplary embodiments should cover all functional and/or structural modifications, equivalents and alternatives which lie within the scope of the disclosed embodiments. In the entire description of the figures, the same reference signs denote the same or similar elements.

It should be noted that an element denoted as "connected" or "coupled" with another element may be directly connected or coupled to the other element or interposed elements may be present. By contrast, if an element is denoted as "directly connected" or "directly coupled" with another element, no elements are interposed. Other terms used to describe the relationships between elements should be interpreted in a similar manner (e.g., "between" vis-à-vis "directly in between", "adjacent" vis-à-vis "directly adjacent", etc.).

The terminology used herein only serves to describe certain exemplary embodiments and should not restrict the exemplary embodiments. As used herein, the singular forms "a", "an", and "the" should also contain the plural forms provided the context does not clearly specify something else. Furthermore, it should be made clear that expressions such as, e.g., "contains", "containing", "has", "comprises", "comprising" and/or "having", as used herein, specify the presence of specified features, integers, operations, work processes, elements and/or components but do not exclude the presence or the addition of one or more features, integers, operations, work processes, elements, components and/or groups thereof.

To the extent that nothing else is defined, all terms used herein (including technical and scientific terms) have the same meaning as apportioned to them by a person of average skill in the art in the field to which the exemplary embodiments belong. Furthermore, it should be made clear that expressions, e.g., those defined in generally used dictionaries, should be interpreted as if they had the meaning consistent with the meaning thereof in the context of the relevant art and should not be interpreted in an idealized or excessively formal sense, provided this is not expressly defined herein.

Figure 2:
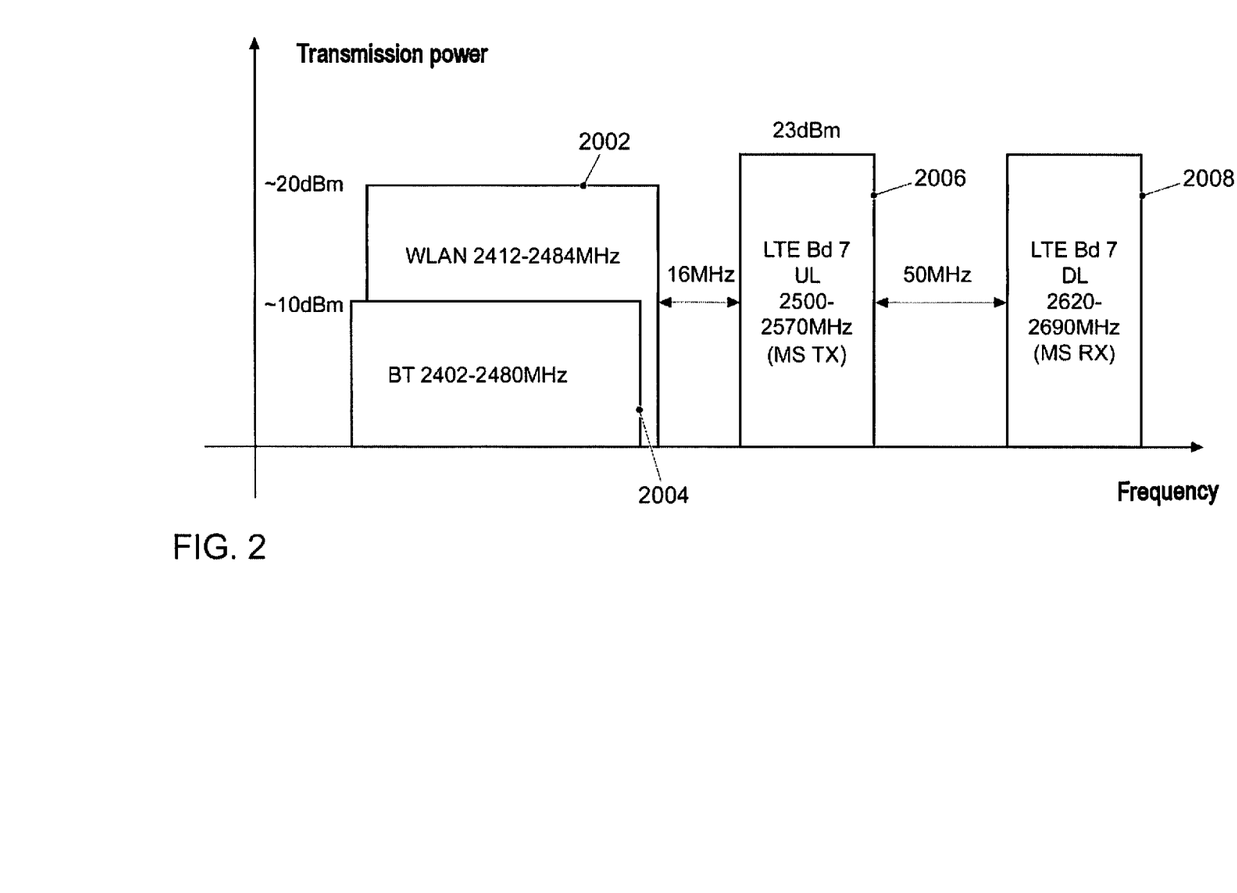
FIG. 2 shows frequency bands of various mobile radio systems in a portion of the decimeter wavelength frequency range in an exemplary manner.

The frequency spectrum in which mobile radio systems use radio resources is restricted. Particularly in the decimeter wavelength frequency range (also referred to as ultra high frequency (UHF) frequency range) of interest for mobile radio systems, frequency bands are used from a multiplicity of different mobile radio systems. FIG. 2 shows, in an exemplary manner, frequency bands of various mobile radio systems in a portion of UHF. Wireless local access networks (WLAN) 2002 use frequency bands between 2412 MHz and 2484 MHz, Bluetooth short-range mobile radio systems 2004 use, overlapping therewith, frequency bands between 2400 MHz and 2480 MHz, and Long Term Evolution (LTE), a cellular mobile radio system, uses, e.g., inter alia, the frequency bands 2620 MHz-2690 MHz 2008 for the reception at the mobile terminal and 2500 MHz-2570 MHz 2006 for the transmission at the mobile terminal (LTE Band 7).

By way of example, intermodulation products may arise by using various radio systems on nonlinear components and assemblies. By way of example, various orders of intermodulation products may arise from two use signals, for example, third order intermodulation products. For these, the following applies in an exemplary manner:

$$f_{im_{3,1}} = 2 \cdot f_1 - f_2 \text{ or } f_{im_{3,2}} = f_1 - 2 \cdot f_2$$

On account of the used frequency bands, a noise source, which falls into the corresponding LTE Band 7 reception channel, may arise from a WLAN transmission signal and an LTE Band 7 transmission signal.

By way of example, these intermodulation products may arise both in the radio components of the WLAN communications module and in radio components of the LTE radio module. Here, internally used filters may weaken the effect in some situations.

Additionally, they may arise on nonlinear components in a roof antenna module (e.g., satellite digital audio radio services (SDARS) receivers, WLAN module or the like) and may not always be able to be filtered.

Figure 3A:
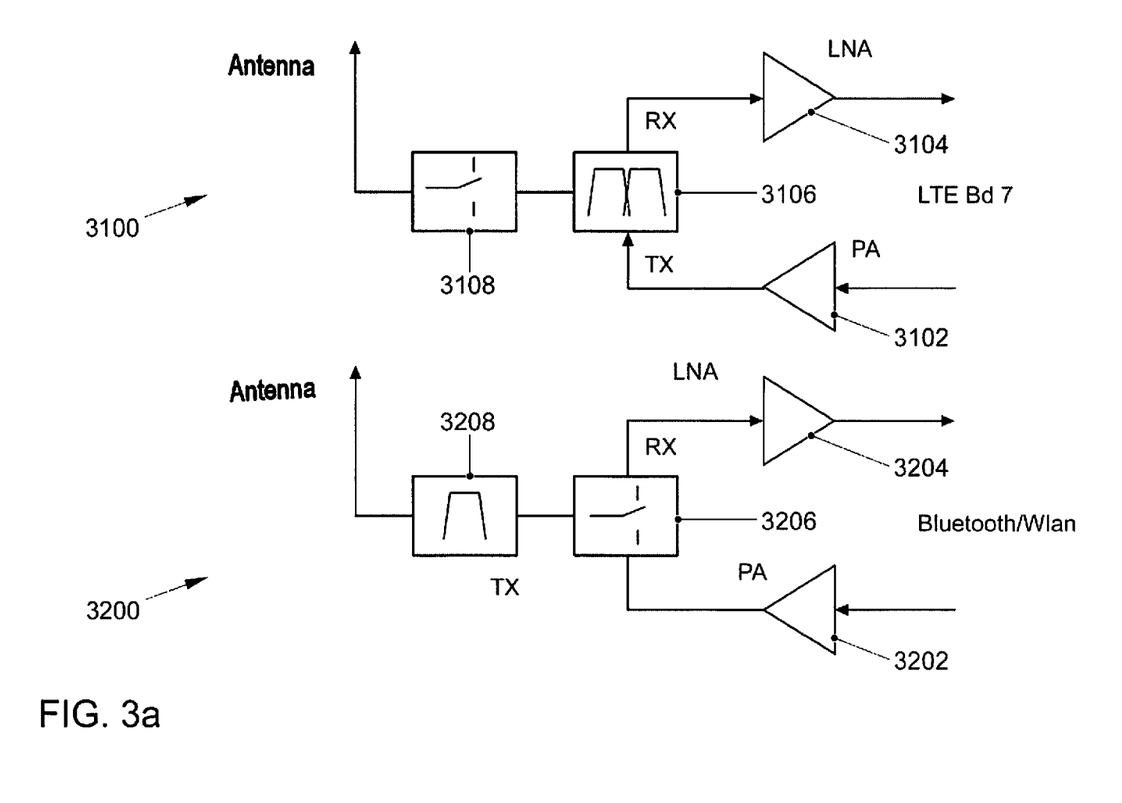
FIG. 3a shows a system architecture for the two communications modules in an exemplary manner.

FIG. 3a shows, in an exemplary manner, a system architecture for two communications modules 3100 and 3200. In FIG. 3a, the communications modules are embodied in an exemplary manner for communication by way of LTE Band 7 (3100), and Bluetooth and WLAN (3200). The communications modules furthermore comprise power amplifiers (PA) 3102 and 3202 for transmission paths of the communications modules and low noise amplifiers (LNA) 3104 and 3204 for reception paths of the communications modules. Furthermore, FIG. 3a shows, in an exemplary manner, a filter module/duplexer 3106 and a selection module for LTE frequency bands 3108 for the LTE communications module 3100. Furthermore, FIG. 3a shows, in an exemplary manner, a switch 3206 between transmission and reception paths of the Bluetooth and WLAN communications module 3200 and a filter module 3208 for the Bluetooth and WLAN communications module 3200.

Figure 3B:
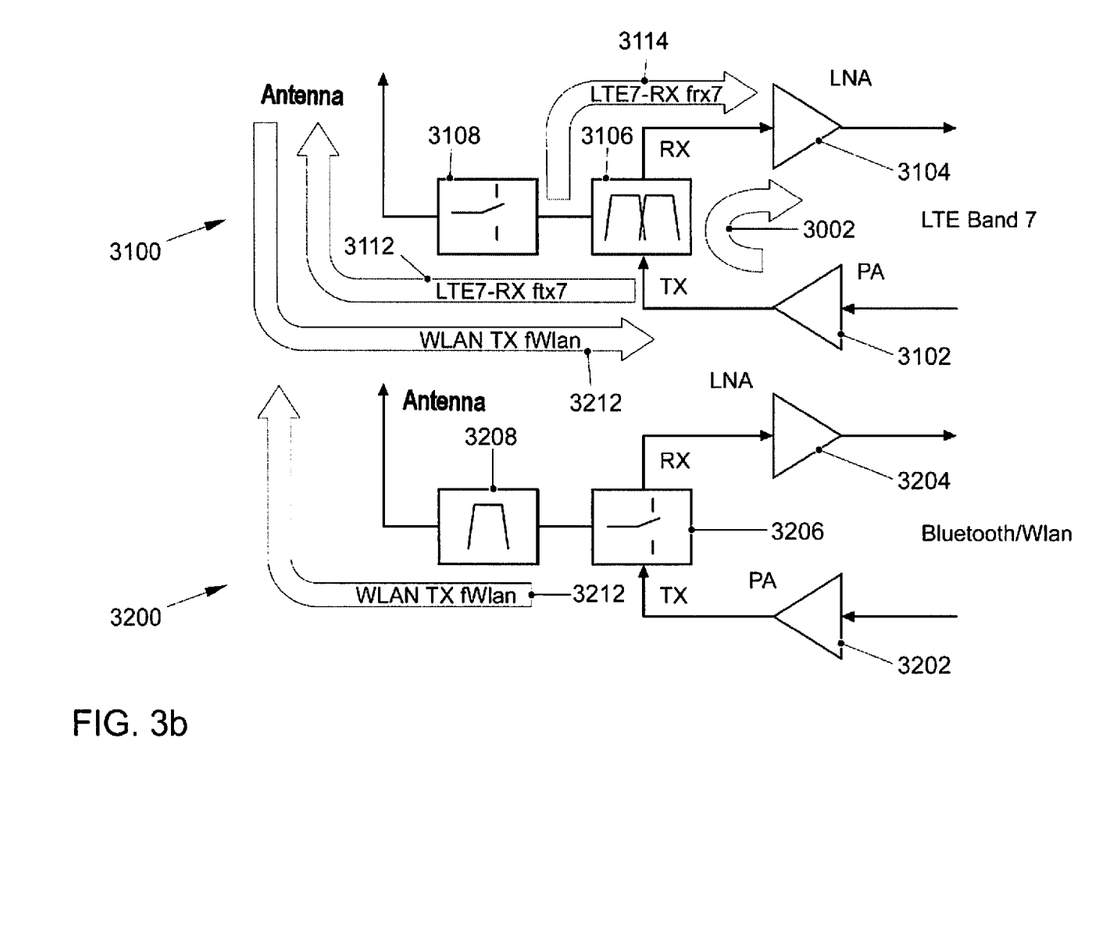
FIG. 3b shows a first exemplary source of intermodulation signals in the system architecture.

FIG. 3b shows, in an exemplary manner, how interference arises by way of intermodulation effects in the system architecture. A transmission signal 3212 WLAN TX fWLAN of the Bluetooth and WLAN communications module 3200 is transferred, in an exemplary manner, to the LTE communications module 3100 via an antenna module used together by the two communications modules 3100; 3200 and forms, together with a transmission signal 3112 LTE7 TX ftx7 of the LTE communications module 3100, an intermodulation signal 3002 on the basis of 2·ftx7−fwlan=frx7 which may interfere with a reception signal 3114 LTE7 RX frx7 of the LTE communications module 3100. Here, the intermodulation signal 3002 arises, in an exemplary manner, in the LTE communications module 3100. The intermodulation signal 3002 and/or the transmission signal 3212 may, for example, be filtered at, e.g., the filter module 3106 (e.g., a duplexer).

Figure 3C:
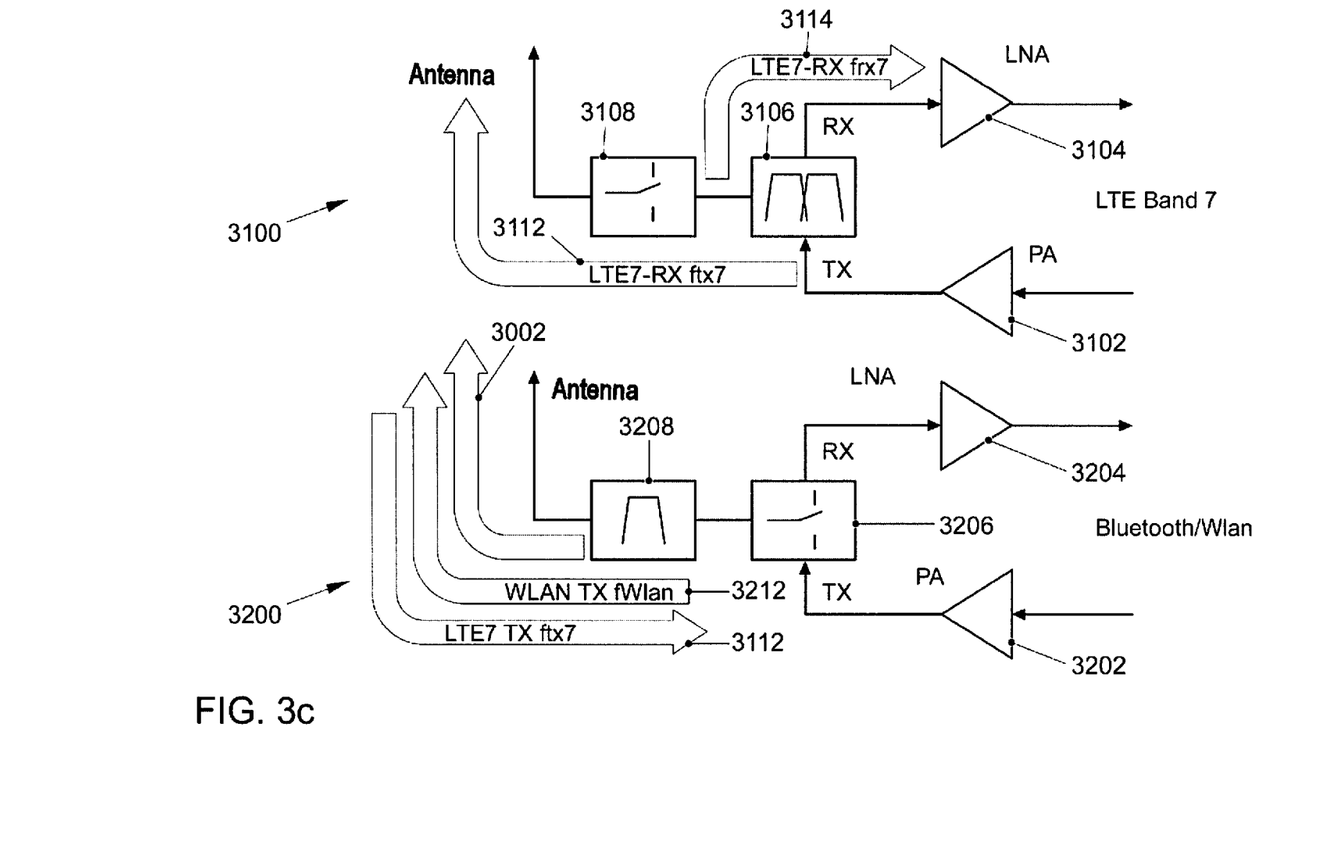
FIG. 3c shows a second exemplary source of intermodulation signals in the system architecture.

FIG. 3c shows a further exemplary possibility of how the interference arises. Here, the transmission signal 3112 of the LTE communications module 3100 is transferred via the common antenna module to the WLAN communications module 3200 and, there, forms the intermodulation signal 3002, for example, in the duplexer 3208, together with the transmission signal 3212 of the Bluetooth and WLAN communications module 3200. The intermodulation signal may then be transferred into the LTE communications module 3100, for example, by way of the common antenna module, and interfere with the reception signal 3114. Here, it may not be possible to place a filter in some system architectures, although it may be possible to influence the interference, for example, by way of an antenna isolation or a lowering of the level.

Figure 3D:
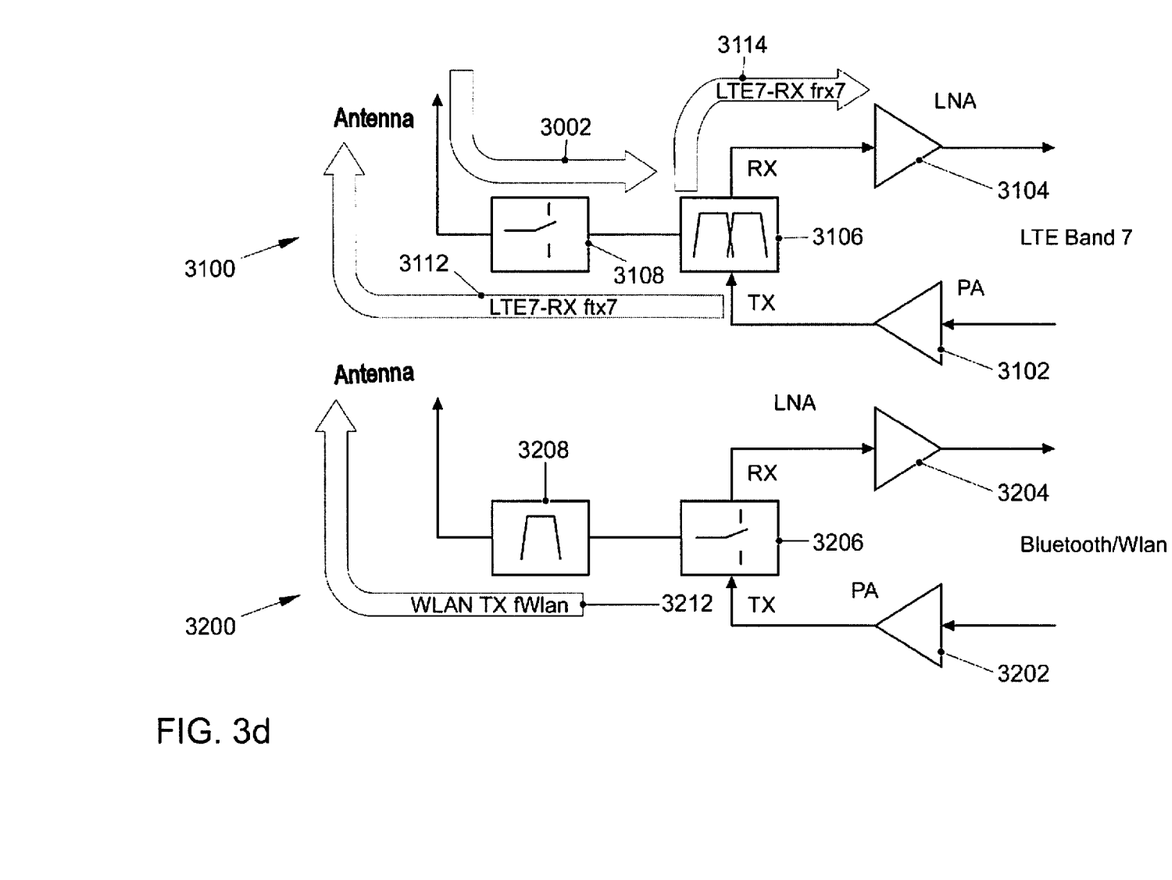
FIG. 3d shows a third exemplary source of intermodulation signals in the system architecture.

FIG. 3d shows a further exemplary possibility of how the interference arises. Both the transmission signal 3112 of the LTE communications module 3100 and the transmission signal 3212 of the Bluetooth and WLAN communications module 3200 form the intermodulation signal 3002 in the antenna module. The intermodulation signal may then be transferred into the LTE communications module 3100 and interfere with the reception signal 3114. Here, filtering may once again not be possible in some system architectures, but the assemblies could have a corresponding intermodulation resistance.

Figure 4:
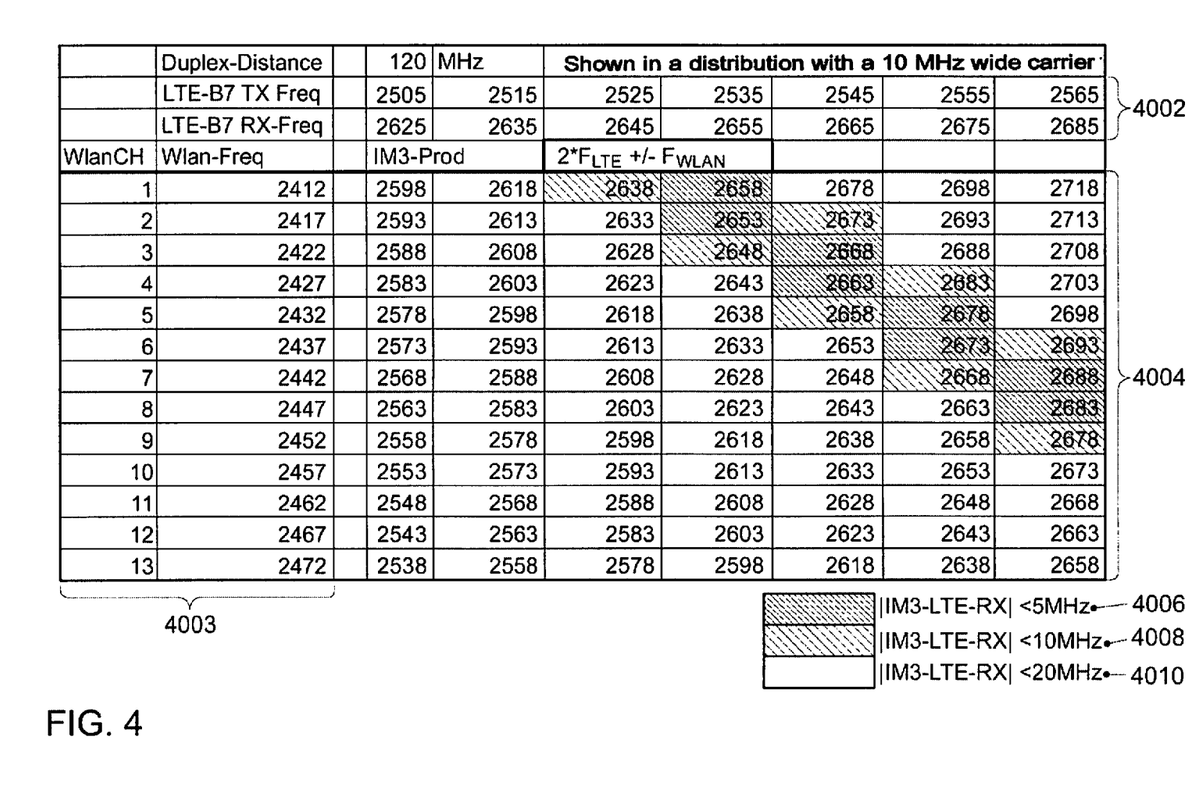
FIG. 4 shows, in an exemplary manner, a table of possible interference by the intermodulation product between LTE Band 7 and 2.4 GHz WLAN.

FIG. 4 shows, in an exemplary manner, a table of possible interference by intermodulation products between LTE Band 7 and 2.4 GHz WLAN. 4002 shows transmission and reception frequencies of LTE Band 7 with a 10 MHz wide frequency band. 4003 shows a list of frequencies of WLAN channels in the 2.4 GHz frequency band. 4004 shows a matrix of possible third order intermodulation products (2·FLTE±FWLAN) between the LTE transmission frequencies of 4002 and the frequencies of the WLAN channels 4003. Marks 4006; 4008 and 4010 in this case denote intermodulation products which may arise within 5 MHz; 10 MHz and 20 MHz about the reception frequencies of LTE Band 7.

At least some exemplary embodiments can reduce or prevent interference from arising in an exemplary manner by reducing the transmission power of the WLAN module 3200 during LTE Band 7 operation in the LTE communications module 3100. One option for reducing the LTE transmission power may, in this case, be restricted by specification of the LTE standard. A power of the intermodulation product may be reduced by reducing the WLAN TX power. By way of example, the reduction may be triggered by determining an intermodulation power of the antenna, or the LTE module 3100 may provide information about the intermodulation signal. By way of example, reduction may be undertaken in a channel-selective manner in the case of an interface between WLAN module 3200 and LTE module 3100.

In time division duplex (TDD) systems, the intermodulation resistance may play a subordinate role since TX and RX signals do not occur simultaneously. The isolation requirements can be transferred taking into account the frequency occupancy.

Figure 1:
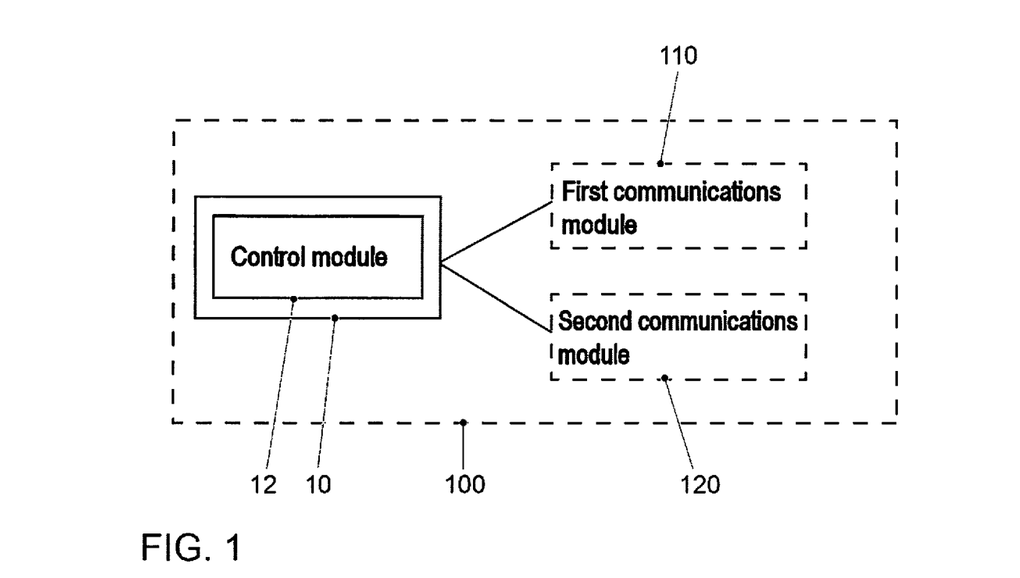
FIG. 1 illustrates a block diagram of an exemplary embodiment of an apparatus for a transceiver system comprising a first communications module for communication in a first mobile radio system and comprising a second communications module for communication in a second mobile radio system.

FIG. 1 illustrates a block diagram of an exemplary embodiment of an apparatus 10 for a transceiver system 100 comprising a first communications module 110 for communication in a first mobile radio system and comprising a second communications module 120 for communication in a second mobile radio system. In some exemplary embodiments, the transceiver system 100 may, e.g., correspond to a transceiver system of a vehicle. Exemplary embodiments, furthermore, develop a vehicle comprising the transceiver system 100.

In exemplary embodiments, the first communications module 110 and/or the second communications module 120 may contain typical transmitter and/or receiver components. These may include, for example, one or more antennas, one or more filters, one or more mixers, one or more amplifiers, one or more diplexers, one or more duplexers, etc. In exemplary embodiments, the first communications module 110 and/or the second communications module 120 may correspond to at least one element of the group comprising WLAN communications module, Bluetooth communications module, mobile radio communications module, UMTS communications module, LTE communications module, communications module of a 5th generation mobile radio network, short-range communications module and communications module for a cellular mobile radio network. By way of example, the first communications module 110 may correspond to the LTE communications module 3100 and the second communications module may, for example, correspond to the Bluetooth and WLAN communications module 3200.

The first mobile radio system and/or the second mobile radio system may, for example, correspond to at least one element of the group consisting of WLAN, IEEE 802.11, Bluetooth, cellular mobile radio, UMTS, LTE, 5th generation mobile radio network and short-range radio.

In some exemplary embodiments, the first communications module 110 may be embodied to communicate in a short-range mobile radio system. The second communications module 120 may be embodied to communicate in a cellular mobile radio system. The short-range mobile radio system may, for example, correspond to a short-range mobile radio system pursuant to IEEE 802.11, WLAN, Bluetooth or a near field communications (NFC) system. Here, IEEE represents the Institute of Electrical and Electronics Engineers and IEEE 802.11 is a standard for short-range mobile radio systems.

In at least some exemplary embodiments, the first communications module 110 may be embodied to communicate in a short-range mobile radio system pursuant to IEEE 802.11. The second communications module 120 may be embodied to communicate in a Long Term Evolution mobile radio system, LTE, a Universal Mobile Telecommunications System, UMTS, or a 5th generation mobile radio system, 5G.

In some exemplary embodiments, the first mobile radio system may be an infrastructure-based communications system. The first communications module 110 may be embodied to communicate as a client in the first mobile radio system. By way of example, the first mobile radio system may moreover comprise an access point and the first communications module may be embodied to communicate as a client with the access point.

The apparatus 10 comprises a control module 12 embodied to adapt the transmission power used in the first mobile radio system on the basis of an activity of the second communications module 120 in the second mobile radio system. By way of example, the control module may be embodied to reduce the transmission power used in the first mobile radio system on the basis of the activity of the second communications module. By way of example, the control module 12 may be embodied to adapt the transmission power of the first communications module 110 for the purposes of adapting the transmission power used in the first mobile radio system, for example, by reducing or increasing the transmission power of the first communications module 110. Alternatively, or additionally, the control module 12 may be embodied to provide, by way of the first communications module 110, information about adaptation of the transmission power to a distant station of the first communications module 110 in the first mobile radio system for the purposes of adapting the transmission power of the distant station in the first mobile radio system.

In exemplary embodiments, the control module 12 may correspond to any controller or processor or a programmable hardware component. By way of example, the control module 12 may also be realized as software which is programmed for a corresponding hardware component. In this respect, the control module 12 may be implemented as programmable hardware with a correspondingly adapted software. Here, use can be made of any processors, such as digital signal processors (DSPs). Here, exemplary embodiments are not restricted to a specific type of processor. Arbitrary processors, or a plurality of processors, are conceivable for implementing the control module 12.

The activity of the second communications module 120 may, for example, correspond to a use of a defined frequency band. By way of example, the defined frequency band may correspond to a frequency band from a plurality of frequency bands which, for example, are comprised in a table, in a database or in configuration data. Alternatively, or additionally, the defined frequency band may be relative to a frequency band used by the first communications module 110. By way of example, the defined frequency band may form intermodulation products with the frequency band of the first communications module 110, the intermodulation products lying at least in part in a reception frequency band of the first communications module 110 or second communications module 120. Alternatively, or additionally, the activity of the second communications module 120 may, e.g., correspond to a transmission activity, an overshoot of the transmission power in a frequency band and/or an undershoot of a signal-to-noise ratio in a reception frequency band of the second communications module.

In at least some exemplary embodiments, the first communications module 110 may be embodied to transmit in a first transmission frequency band. The second communications module 120 may be embodied to transmit in a second transmission frequency band. The first communications module 110 or the second communications module 120 may be embodied to receive in at least one reception frequency band. An intermodulation product of a first transmission signal in the first transmission frequency band and of a second transmission signal in the second transmission frequency band may lie, at least in part, in the at least one reception frequency band. In some exemplary embodiments, the first communications module 110 may be embodied to simultaneously transmit in the first transmission frequency band and receive in the at least one reception frequency band. Alternatively, or additionally, the second communications module 120 may be embodied to simultaneously transmit in the second transmission frequency band and receive in the at least one reception frequency band. By way of example, the frequency bands may correspond to frequency bands which are used in the aforementioned mobile radio system.

Figure 1A:
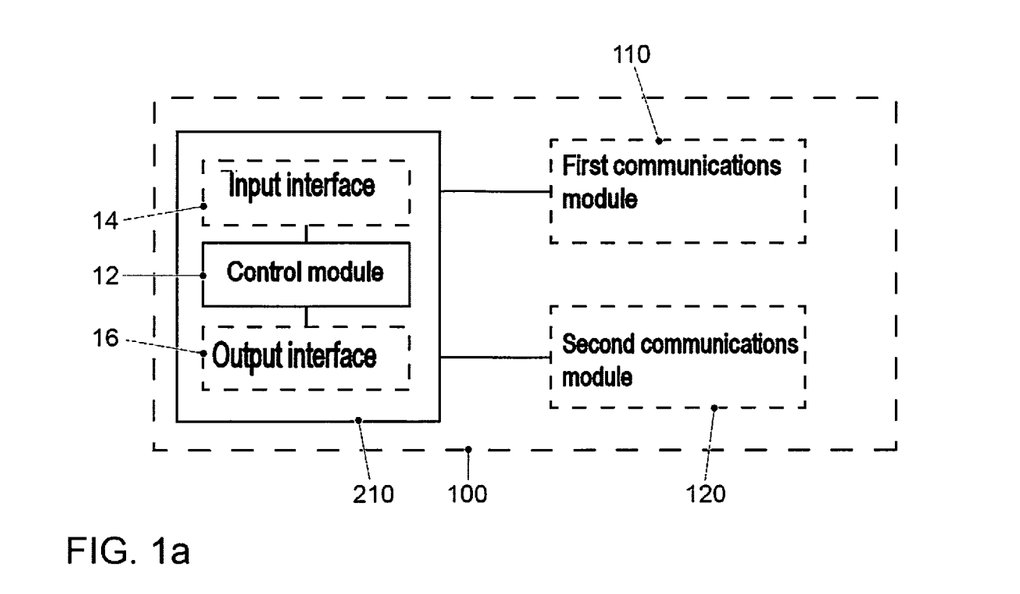
FIG. 1a illustrates a block diagram of a further exemplary embodiment of the apparatus for the transceiver system.

FIG. 1a illustrates a block diagram of a further exemplary embodiment of the apparatus 10 as an extension of FIG. 1. FIG. 1a shows the apparatus 10, additionally comprising an optional input interface 14 and an optional output interface 16. The optional input interface 14 and the optional output interface 16 are coupled to the control module 12.

By way of example, the input interface 14 may correspond to one or more inputs for receiving information or signals, for example, in digital bit values, voltages, currents or electromagnetic waves, for example, on the basis of a code, within a module, between modules or between modules of different entities. By way of example, the output interface 16 may correspond to one or more outputs for transferring information or signals, for example, in digital bit values, voltages, currents or electromagnetic waves, for example, on the basis of a code, within a module, between modules or between modules of different entities. By way of example, the input interface 14 and the output interface 16 may be combined in a transceiver module.

In some exemplary embodiments, the control module 12 may be embodied to obtain information about an intermodulation signal based on the intermodulation product by way of the input interface 14. By way of example, the intermodulation signal may be based on a first transmission signal of the first communications module 110 and a second transmission signal of the second communications module 120 and may, for example, arise in a nonlinear component of the first communications module 110, of the second communications module 120, of an antenna module of the transceiver system 100 and/or of a further nonlinear component of the transceiver system 100. By way of example, the information about the intermodulation signal may correspond to the intermodulation signal or, for example, to properties of the signal, for example, a frequency and amplitude, which were detected by the first communications module 110 or by the second communications module 120.

The control module 12 may furthermore be embodied to determine information about an intermodulation power on the basis of the information about the intermodulation signal. By way of example, the intermodulation power may be based on an amplitude or power of the intermodulation signal, for example, in a reception module of the first communications module 110 or of the second communications module 120.

The control module 12 may furthermore be embodied to adapt the transmission power used in the first mobile radio system on the basis of the information about the intermodulation power. By way of example, the control module 12 may be embodied to adapt the transmission power used in the first mobile radio system in such a way that the intermodulation power lies under a threshold. By way of example, the threshold may correspond to an upper limit for the power or amplitude of the intermodulation signal and may, for example, be based on a desired signal-to-noise ratio in a reception module of the first communications module 110 or of the second communications module 120.

In at least some exemplary embodiments, the control module 12 may be embodied to obtain information about transmission signals of the first communications module 110 and the second communications module 120 by way of the input interface 14. The information about the transmission signals may, for example, comprise at least one element of the group of the transmission signals, information about bit values of the transmission signals, information about a predistortion of the transmission signals, and information about the transfer function of at least one portion of a transmission path of the transmission signals. The control module 12 may be embodied to determine an expected intermodulation signal on the basis of the information about the transmission signals of the first communications module 110 and of the second communications module 120. By way of example, the control module 12 may be embodied to determine the expected intermodulation signal on the basis of at least one element of the group of the transmission signals, information about bit values of the transmission signals, information about a predistortion of the transmission signals, information about a transfer function of at least one portion of a transmission path of the transmission signals, and information about at least one characteristic of a reception unit of the first communications module 110 and/or of the second communications module. The control module 12 may furthermore be embodied to determine an interference-reduction signal on the basis of the expected intermodulation signal. By way of example, the interference-reduction signal may correspond to a signal for compensating the expected intermodulation signal in a reception unit. By way of example, the control module 12 may further be embodied to provide the interference-reduction signal to the first communications module 110 and/or to the second communications module 120 by way of the output interface 16, for example, for reducing interference by the intermodulation signal. Alternatively, or additionally, the control module 12 may be embodied to provide signal processing of an input signal of the first communications module 110 and/or of the second communications module 120 on the basis of the interference-reduction signal, for example, to reduce or suppress the influence of the intermodulation signal on the reception signal. In some exemplary embodiments, the apparatus 10 or the input interface 14, the control module 16 and/or the output interface 16 may be arranged between an antenna module of the transceiver system 100 and an antenna input of the first communications module 110 and/or of the second communications module 120.

Exemplary embodiments furthermore develop the transceiver system comprising the first communications module 110, the second communications module 120 and the apparatus 10.

Figure 5:
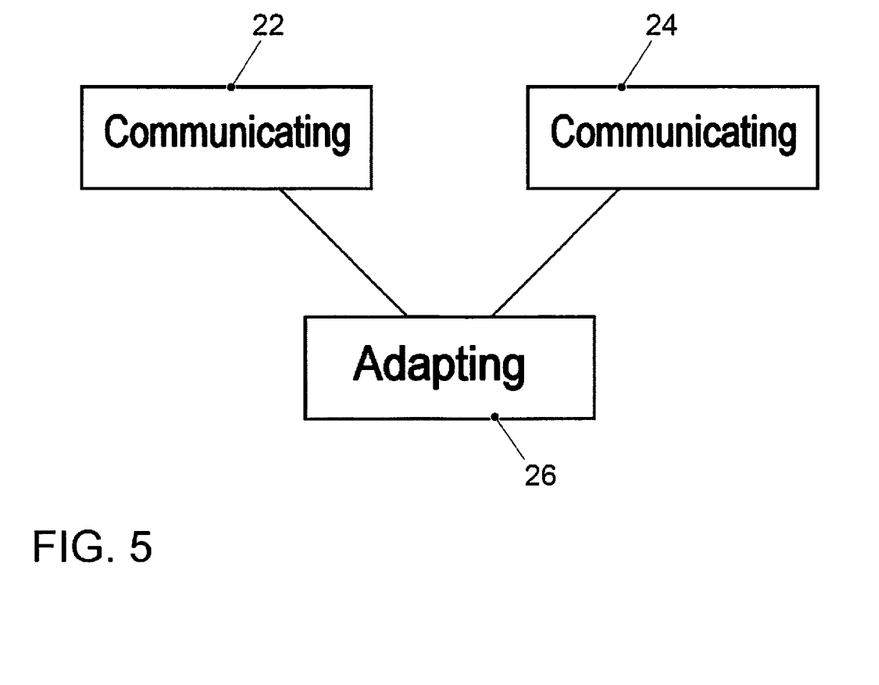
FIG. 5 shows a flowchart of an exemplary embodiment of a method for a transceiver system for communication in two mobile radio systems.

FIG. 5 shows a flowchart of an exemplary embodiment of a method for a transceiver system 100 for communication in two mobile radio systems. The method comprises communicating 22 in a first mobile radio system. The method furthermore comprises communicating 24 in a second mobile radio system. The method furthermore comprises adapting 26 the transmission power used in the first mobile radio system on the basis of an activity in the second mobile radio system.

A further exemplary embodiment is a computer program for carrying out at least one of the above-described methods when the computer program is run on a computer, a processor or a programmable hardware component. A further exemplary embodiment is also a digital storage medium, which is machine-readable or computer-readable, and which has electronically readable control signals which may interact with a programmable hardware component in such a way that one of the above-described methods is carried out.

The features disclosed in the foregoing description, the subsequent claims and the attached figures can be of significance and implemented in their various configurations both individually and in any combination for implementing an exemplary embodiment.

Although some embodiments have been described in connection with an apparatus, it goes without saying that these disclosed embodiments are also a description of the corresponding method, which means that a block or an element of an apparatus is also intended to be understood to mean a corresponding method operation or to mean a feature of a method operation. Similarly, embodiments which have been described in connection with or as a method operation are also a description of a corresponding block or detail or feature of a corresponding apparatus.

Depending on the specific implementation requirements, it is possible for exemplary embodiments to be implemented in hardware or in software. The implementation can be performed using a digital storage medium, for example, a floppy disk, a DVD, a Blu-Ray disk, a CD, a ROM, a PROM, an EPROM, an EEPROM or a FLASH memory, a hard disk or another magnetic or optical storage means which stores electronically readable control signals which can interact, or do interact, with a programmable hardware component in such a way that the respective method is carried out.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single-chip system (SOC=system on chip), a programmable logic element or a field-programmable gate array (FPGA) with a microprocessor.

The digital storage medium may therefore be machine-readable or computer-readable. Some exemplary embodiments therefore comprise a data storage medium which has electronically readable control signals which are able to interact with a programmable computer system or a programmable hardware component in such a way that one of the methods described in this document is carried out. An exemplary embodiment is therefore a data storage medium (or a digital storage medium or a computer-readable medium) on which the program for carrying out one of the methods described in this document is recorded.

In general, exemplary embodiments may be implemented as a program, firmware, computer program or computer program product with a program code or as data, wherein the program code or the data is effective for carrying out one of the methods when the program is run on a processor or a programmable hardware component. The program code or the data may also be stored, for example, on a machine-readable storage medium or data storage medium. The program code or the data may be present as source code, machine code or byte code and also as other intermediate code, amongst others.

Furthermore, a further exemplary embodiment is a data stream, a signal train or a sequence of signals which is or are the program for carrying out one of the methods described in this document. The data stream, the signal train or the sequence of signals may be configured, for example, to be transferred via a data communication link, for example, via the internet or another network. Exemplary embodiments are therefore also signal trains which represent data and which are suitable for transmission via a network or a data communication link, wherein the data is the program.

A program according to an exemplary embodiment may implement one of the methods when it is carried out, for example, by reading memory locations or writing a data item or multiple data to the memory locations, this resulting in switching processes or other processes in transistor structures, in amplifier structures, or in other electrical, optical or magnetic assemblies or assemblies operating on the basis of a different operating principle, if need be. Accordingly, by reading a memory location, it is possible to capture, determine or measure data, values, sensor values or other information from a program. A program can therefore capture, determine or measure magnitudes, values, measurement variables and other information by reading one or more memory locations, and can cause, prompt or carry out an action and also actuate other devices, machines and components by writing to one or more memory locations.

The exemplary embodiments described above are merely an illustration of the principles. It goes without saying that modifications to and variations in the arrangements and details described in this document will be apparent to other persons skilled in the art. It is, therefore, intended that the disclosed embodiments be limited only by the scope of protection of the patent claims below and not by the specific details which have been presented using the description and the explanation of the exemplary embodiments in this document.

LIST OF REFERENCE SIGNS

10 Apparatus
12 Control module
14 Input interface

16 Output interface
22 Communicating
24 Communicating
26 Adapting
100 Transceiver system
110 First communications module
120 Second communications module
2002 2.4 GHz WLAN frequency bands
2004 Bluetooth frequency bands
2006 Transmission frequency bands LTE Band 7
2008 Reception frequency bands LTE Band 7
3002 Intermodulation signal
3100 LTE communications module
3102 Power amplifier
3104 Low noise amplifier
3106 Filter module/duplexer
3108 Selection module for LTE frequency bands
3112 Transmission signal of the LTE communications module
3114 Reception signal of the LTE communications module
3200 Bluetooth and WLAN communications module
3202 Power amplifier
3204 Low noise amplifier
3206 Switch between transmission and reception paths of the Bluetooth and WLAN communications module
3208 Filter module
3212 Transmission signal of the Bluetooth and WLAN communications module
3214 Reception signal of the Bluetooth and WLAN communications module
4002 Transmission and reception frequencies in LTE Band 7
4003 Frequencies of WLAN channels in the 2.4 GHz frequency band
4004 Matrix of possible intermodulation products
4006 Marks of intermodulation products within 5 MHz about the LTE Band 7 reception frequency
4008 Marks of intermodulation products within 10 MHz about the LTE Band 7 reception frequency
4010 Marks of intermodulation products within 20 MHz about the LTE Band 7 reception frequency

The invention claimed is:

1. An apparatus for a transceiver system included in a transportation vehicle, the apparatus comprising:
a first communications module for communication in a first mobile radio system; and
a second communications module for communication in a second mobile radio system and
a control module that adapts a transmission power level used in the first mobile radio system based on activity of the second communications module in the second mobile radio system to reduce interference arising from intermodulation of transmission frequencies used by the first and second communications module by facilitating dynamic adaptation of the transmission power level used in the first mobile radio system,
wherein the activity of the second communications module corresponds to the use of a defined frequency band for communication that is different than a frequency band used by the first communications module,
wherein the control module determines an expected intermodulation signal based on information about communication of the first communications module and the second communications module,
wherein the expected intermodulation signal is indicative of one or more intermodulation products resulting from interference between communication of the first communications module and communication of the second communications module, and
wherein the dynamic adaptation of the transmission power level used in first mobile radio system is performed based on the intermodulation signal in response to determination that intermodulation effects are expected based on relative location of the frequency bands for communication by the first and second communications modules.

2. The apparatus of claim 1, wherein the control module reduces the transmission power level used in the first mobile radio system based on the activity of the second communications module.

3. The apparatus of claim 1, wherein the first communications module transmits in a first transmission frequency band, wherein the second communications module transmits in a second, different, transmission frequency band, and wherein the first communications module or the second communications module receives in at least one reception frequency band, and wherein the one or more intermodulation products is of a first transmission signal in the first frequency band and of a second transmission signal in the second transmission frequency band, wherein the one or more intermodulation products lies at least in part in the at least one reception frequency band.

4. The apparatus of claim 3, wherein the first communications module transmits in the first transmission frequency band and, at the same time, receives in the at least one reception frequency band, and/or wherein the second communications module transmits in the second transmission frequency band and, at the same time, receives in the at least one reception frequency band.

5. The apparatus of claim 3, further comprising an input interface wherein the control module obtains the information about the intermodulation signal, which is based on the one or more intermodulation products, by way of the input interface, wherein the control module further determines information about intermodulation power based on the information about the intermodulation signal, and wherein the control module further adapts the transmission power, which is used in the first mobile radio system, based on the information about the intermodulation power.

6. The apparatus of claim 5, wherein the control module adapts the transmission power which is used in the first mobile radio system so that the intermodulation power level lies below a threshold.

7. The apparatus of claim 6, further comprising an output interface, wherein the control module provides the interference-reduction signal to the first communications module and/or the second communications module by way of the output interface, or wherein the control module provides signal processing of an input signal of the first communications module and/or the second communications module based on the interference-reduction signal.

8. The apparatus of claim 1, further comprising an input interface, wherein the control module obtains the information about the transmission signals of the first communications module and the second communications module by way of the input interface, and wherein the control module further determines an interference-reduction signal based on the expected intermodulation signal.

9. The apparatus of claim 1, wherein the first communications module communicates in a short-range mobile radio system and wherein the second communications module communicates in a cellular mobile radio system.

10. The apparatus of claim 1, wherein the first communications module communicates in a short-range mobile radio system pursuant to IEEE 802.11 and wherein the second communications module communicates in a Long Term Evolution mobile radio system, LTE, a Universal Mobile Telecommunications System, UMTS, or a 5th generation mobile radio system, 5G.

11. The apparatus of claim 1, wherein the first mobile radio system is an infrastructure-based communications system and wherein the first communications module communicates in the first mobile radio system as a client.

12. The apparatus of claim 1, wherein the control module adapts the transmission power level used in the first mobile radio system in such a way that the intermodulation power lies under a power threshold, wherein the power threshold is set based on a desired signal-to-noise ratio in the first communications module and/or the second communications module.

13. A method for a transceiver system for communication in two mobile radio systems, the method comprising:
  a first communications module communicating in a first mobile radio system;
  a second communications module communicating in a second mobile radio system; and
  adapting, under control of a control module, a transmission power level used in the first mobile radio system based on activity in the second mobile radio system to reduce interference arising from intermodulation of transmission frequencies used by the first and second communications module by facilitating dynamic adaptation of the transmission power level used in the first mobile radio system,
  wherein the activity of the second communications module corresponds to the use of a defined frequency band for communication that is different than a frequency band used by the first communications module,
  wherein the control module determines an expected intermodulation signal based on information about communication of the first communications module and the second communications module,
  wherein the expected intermodulation signal is indicative of one or more intermodulation products resulting from interference between communication of the first communications module and communication of the second communications module, and
  wherein the dynamic adaptation of the transmission power level used in first mobile radio system is performed based on the intermodulation signal in response to determination that intermodulation effects are expected based on relative location of the frequency bands for communication by the first and second communications modules.

14. The method of claim 13, wherein the control module adapts the transmission power level used in the first mobile radio system in such a way that the intermodulation power lies under a power threshold, wherein the power threshold is set based on a desired signal-to-noise ratio in the first communications module and/or the second communications module.

15. A non-transitory computer-readable medium comprising a program, comprising a program code for carrying out a method for a transceiver system for communication in two mobile radio systems when the program code is run on a computer, a processor, a control module or a programmable hardware component, the method comprising:
  a first communications module communicating in a first mobile radio system;
  a second communications module communicating in a second mobile radio system; and
  adapting, under control of a control module, a transmission power level used in the first mobile radio system based on activity in the second mobile radio system to reduce interference arising from intermodulation of transmission frequencies used by the first and second communications module by facilitating dynamic adaptation of the transmission power level used in the first mobile radio system,
  wherein the activity of the second communications module corresponds to the use of a defined frequency band for communication that is different than a frequency band used by the first communications module,
  wherein the control module determines an expected intermodulation signal based on information about communication of the first communications module and the second communications module,
  wherein the expected intermodulation signal is indicative of one or more intermodulation products resulting from interference between communication of the first communications module and communication of the second communications module, and
  wherein the dynamic adaptation of the transmission power level used in first mobile radio system is performed based on the intermodulation signal in response to determination that intermodulation effects are expected based on relative location of the frequency bands for communication by the first and second communications modules.

16. The computer readable medium of claim 15, wherein the control module adapts the transmission power level used in the first mobile radio system in such a way that the intermodulation power lies under a power threshold, wherein the power threshold is set based on a desired signal-to-noise ratio in the first communications module and/or the second communications module.

* * * * *